United States Patent Office 3,531,446
Patented Sept. 29, 1970

3,531,446
PROCESS FOR THE MANUFACTURE OF AMORPHOUS COPOLYMERS FROM ETHYLENE AND HIGHER α-OLEFINS IN SUSPENSION
Siegfried Sommer, Bad Soden, Taunus, and Johannes Brandrup, Neu-Isenburg, Germany, assignors to Farbwerke Hoechst Aktiengesellschaft, Frankfurt am Main, Germany, a corporation of Germany
No Drawing. Filed Feb. 23, 1968, Ser. No. 707,474
Claims priority, application Germany, Mar. 10, 1967, F 51,785
Int. Cl. C08f 1/11
U.S. Cl. 260—80.78
6 Claims

ABSTRACT OF THE DISCLOSURE

The present invention relates to a process for the manufacture of copolymers from ethylene and higher α-olefins and of terpolymers from ethylene, a higher α-olefin and a non-conjugated diene. Although these polymers may have rubber-like features, they are obtained according to the invention in form of small particles which do not stick together. This is effected by carrying out the polymerization in a halohydrocarbon as dispersion medium and a finely divided inert solid organic polymer as separating agent.

---

The present invention relates to a process for the manufacture of copolymers from ethylene and higher α-olefins in suspension.

It has been proposed to transform ethylene and other α-olefins by the so-called low pressure process into high molecular weight copolymers with the aid of organometal mixed catalysts, known as Ziegler catalysts, under a pressure in the range of from 0 to 30 atmospheres gauge and at a temperature ranging from −30° C. to +150° C.

When a relatively high proportion of a higher α-olefin is used (above about 25% by weight) the copolymer obtained in this manner is not crystalline and can be used as rubber. Rubber-like copolymers containing a high proportion of α-olefins are soluble in aliphatic, aromatic and cycloaliphatic hydrocarbons and in a series of halohydrocarbons, for example in carbon tetrachloride, tetrachloroethylene and trichloroethylene. The monomer mixture is polymerized in the specified solvents and the copolymer is obtained in the form of a highly viscous solution (solution polymerization).

The highly viscous copolymer solutions have, however, the serious drawback that in the solvents a relatively small amount of copolymer can be dissolved only (about 5 to 10% by weight). It is thus necessary to use large amounts of solvent which must be agitated and then removed to obtain the copolymer. Moreover, for stirring and agitating the highly viscous solutions high amounts of energy are required.

It has also been proposed to carry out the copolymerization in liquids that do not dissolve the polymer. The number of suitable dispersion media is, however, limited because most of the known dispersion media are polar with respect to the rubber-like copolymers and react with the catalyst system which thereby loses its activity.

In the process of British Pat. 849,112 are used as dispersion media for the preparation of suspensions of copolymers of the aforesaid type, for example, methylene chloride, methylene bromide, ethyl chloride and 1,2-dichloroethane.

British Pat. 925,468 proposes for the preparation of suspensions of elastomers of the aforesaid kind methylene chloride, ethyl chloride and 1,2-dichloroethane.

It has hitherto not been possible, however, to put into industrial practice a copolymerization in the known dispersion media owing to the physical constitution of the precipitating copolymers. They separate in the aforesaid liquids in the form of large and small, readily agglomerating lumps which adhere to the stirrer and walls of the reaction vessel and obstruct the inlets and outlets. It is thus impossible to carry out the reaction in a reproducible manner.

The present invention provides a process for copolymerizing ethylene with higher α-olefins of the formula $$R\text{---}CH=CH_2$$ 

in which R stands for an aliphatic, branched or straight-chain hydrocarbon radical having less than 7 carbon atoms, if desired together with a non-conjugated diene in an amount such that the formed terpolymer has an iodine number of at most 50, under a pressure in the range of from 1 to 30 atmospheres and at a temperature ranging from −30 to +50° C., in the presence of a halohydrocarbon as dispersion media, which halohydrocarbon does not dissolve the copolymer under the reaction conditions, using a coordination catalyst comprising a vanadium compound and an organoaluminum compound both soluble in the dispersion medium used, which comprises carrying out the polymerization in the presence of 0.0001 to 10% by weight, calculated on the dispersion medium, of a finely divided, inert, solid, organic polymer (separating agent) of a particle size in the range of from 0.005 to 300 microns which does not inhibit the polymerization activity and is insoluble both in the dispersion medium and in the separating copolymer, while stirring or mechanically agitating the polymerization batch.

The presence of 0.0001 to 10% by weight, calculated on the dispersion medium, of the finely divided, inert, organic polymer in the polymerization batch prevents the tacky and elastic copolymer particles from agglomerating at a temperature in the range of from −30 to +50° C., preferably −10 to +40° C. Even with a high content of polymer of 100 to 400 grams per liter of dispersion medium the beads remain separate and after polymerization they can be freed from the major part of the dispersion medium and separating agent by filtration or centrifugation.

Suitable separating agents are all solid organic polymers that are readily suspendable in the polymerization medium, insoluble in the dispersion medium and the separating polymers and do not inhibit the catalyst system, for example polyethylene, polypropylene, polybutene-1, poly-3-methylbutene-1, polypentene-1, poly-4-methylpentene-1 and polymers of olefins having 10 to 24 carbon atoms, or copolymers of the aforesaid olefins with up to 10% of a second olefin. It is also possible to use polyacrylonitrile, polyvinyl chloride, polyethylene glycol terephthalate, polycaprolactam, polyvinyl fluoride, polytetrafluoroethylene, polyvinylidene fluoride and/or condensation products of formaldehyde with phenols or amines. Alternatively, finely divided, natural polymers may be used, for example pulverized coconut shells.

Polyethylene, polypropylene, poly-4-methylpentene-1 and polyacrylonitrile are preferred.

The function of the organic polymers added as separating agents, which function consists in preventing the formed copolymer beads from agglomerating, accounts for the fact that the usual characteristic properties of polymers, such as density, molecular weight, number of branchings, molecular weight distribution, and small additions of comonomers, are not critical but that the fineness of the products, i.e. the distribution of particle sizes, of the products is of decisive importance. The polymers added as separating agent should have a particle size in the range of from 0.005 to 300 microns, preferably below 100 microns. The smaller the particle size of the polymer used as separating agent the smaller the amount of polymer required to obtain a satisfactory separating effect.

The polymer used should be chemically inert and not inhibit the activity of the coordination catalyst to an extent such that the copolymerization is impaired or rendered impossible.

As catalysts for the copolymerization of ethylene with higher $\alpha$-olefins there are used coordination catalysts which are soluble in the dispersion medium and comprise:

(I) A vanadium compound, for example $VOCl_3$, $VCl_4$, vanadium triacetylacetonate, vanadium oxydiacetylacetonate, vanadium naphthenate, vanadium benzoate, or vanadium esters such as $VO(OC_4H_9\text{-}i)_3$, $VO(OC_3H_7\text{-}i)_3$, $VO(OC_2H_5)Cl_2$, or $VO(OC_2H_5)_2Cl$, preferably $VOCl_3$ and (II) An organoaluminum compound of the general formula $AlR_nX_{3-n}$, in which $n$ is 1, 2, or 3, R stands for an alkyl radical and X represents a halogen atom, for example $Al_2(C_2H_5)_3Cl_3$, $Al(C_2H_5)_2Cl$, $Al(C_2H_5)Cl_2$, $Al_2(i\text{-}C_4H_9)_3Cl_3$, $Al(i\text{-}C_4H_9)_2Cl$, $Al(i\text{-}C_4H_9)Cl_2$, preferably $Al_2R_3Cl_3$ or a compound of the formula $AlR_3$, for example $Al(C_2H_5)_3$ and $Al(i\text{-}C_4H_9)_3$.

Elastic rubber-like products capable of being cross-linked with sulfur can be obtained when a small amount of a doubly unsaturated compound is incorporated into the specified olefin copolymers, one double bond of which compound participates in the polymerization while the other double bond remains unchanged for the subsequent vulcanization with sulfur.

Suitable tercomponents for this purpose are 1,4-cis-hexadiene, 1,4-trans-hexadiene, alkenyl-norbornenes such as 5 - (2' and/or 3' - methyl-2'-butenyl)-norbornene-2, alkylidene-norbornenes such as 5-methylene-norbornene-2 or 5-ethylidene-norbornene-2, and dicyclopentadiene.

The presence of the tercomponents has no influence whatsoever on the formation of the beads and on the function of the separating agents so that the process of the invention is also suitable for the production of terpolymers of the kind specified above.

In order to produce a rubber having good properties of use after vulcanization the catalyst system must be used in the form of a homogeneous solution.

In the process of the invention ethylene can be copolymerized with propylene, butene-1, isobutene, pentene-1, hexene-1, 4-methyl-pentene-1, and other branched and straight-chain $\alpha$-olefins having less than 9 carbon atoms, propylene being preferred. Ethylene and propylene (or higher $\alpha$-olefins having less than 9 carbon atoms) are copolymerized in a proportion such that copolymers having elastic, rubber-like properties are obtained, that is to say the proportion of $\alpha$-olefin units in the copolymer can be as high as 20 to 80% by weight, preferably 30 to 75% by weight.

The copolymerization is carried out at a temperature in the range of from −30 to +50° C., advantageously −10 to 40° C. At a temperature above 50° C. the polymer starts to swell in the dispersion medium and partly dissolves so that the separating agents lose their effectiveness.

Suitable dispersion media in the process of the invention are 1,2 - dichloropropane, 1,2,2 - trichloro-1,1,2-trifluoroethane, ethylene chloride, 1,2-dichloroethane and methylene chloride, the two latter compounds being preferred.

The following examples serve to illustrate the invention but they are not intended to limit it thereto.

EXAMPLE 1 (comparative example)

In a glass vessel having a capacity of 3 litres, provided with a perforated blade stirrer of stainless steel, three ground in dropping funnels, a reflux condenser with connected mercury excess pressure valve, a gas inlet tube and a thermometer, 1 liter of 1,2-dichloroethane was saturated, with exclusion of air and moisture, at the polymerization temperature (15°) and while stirring, with a gas mixture consisting of 1 part by volume of ethylene and 2 parts by volume of propylene. When the monomer mixture had the right composition for the production of uniform products, $\frac{1}{20}$ of the amount of $VOCl_3$ (0.025 millimole per liter) was added to the saturated 1,2-dichloroethane and ethylaluminum sesquichloride (2 molar solution in 1,2-dichloroethane) was then dropped in through a dropping funnel until polymerization set in, detectable by the subatmospheric pressure formed in the vessel. Ethylene/propylene were then introduced in a ratio of 3:2 in an amount to compensate pressure and $VOCl_3$ (0.5 millimole per liter) and ethylaluminum sesquichloride (20 millimoles per liter) were uniformly dropped in during the course of 100 minutes. The copolymer separated from the solution in the form of small balls which rapidly agglomerated on the stirrer and the wall of the vessel to large lumps which necessitated interruption of the polymerization when a high solids content was reached owing to the imbalance of the stirrer.

Yield: 160 grams.

RSV (reduced specific viscosity): 2.1, determined with a 0.1% by weight solution in decahydronaphthalene at 135° C.

Content of $C_3$ hydrocarbon: 45.5% by weight.

EXAMPLE 2

The copolymerization was carried out under the conditions specified in comparative Example 1 with the exception that 0.5 gram of polypropylene having a particle size of 10 to 20 microns (RSV 1.5) was added to the dispersion medium. The separating polymer beads did not agglomerate, they remained separate in the solution and were easy to filter.

Yield: 130 grams.

RSV: 2.0, determined with a 0.1% by weight solution in decahydronaphthalene at 135° C.

Content of $C_3$ hydrocarbon: 48% by weight.

EXAMPLE 3

The copolymerization was carried out as described in Example 1, with the exception that 1 gram of polypropylene having a particle size of 35 to 40 microns (RSV 4.1) was added to the dispersion medium. The polymer beads obtained did not agglomerate.

Yield: 140 grams.

RSV: 2.4, determined with a 0.1% by weight solution in decahydronaphthalene at 135° C.

Content of $C_3$ hydrocarbon: 47.3% by weight.

EXAMPLE 4

The copolymerization was carried out as described in comparative Example 1, with the exception that 1 gram of polyethylene having a particle size of 50 to 100 microns (RSV 2.1) was added to the dispersion medium. The polymer beads obtained did not ogglomerate.

Yield: 160 grams.

RSV: 2.6, determined with a 0.1% by weight solution in decahydronaphthalene at 135° C.

Content of $C_3$ hydrocarbon: 49.2% by weight.

EXAMPLE 5

The copolymerization was carried out as described in comparative Example 1, with the exception that 1 gram of poly - 4 - methylpentene - 1 having a particle size of 40 to 100 microns (RSV 3.5) was added to the dispersion medium. The polymer beads obtained did not agglomerate.

Yield: 180 grams.

RSV: 2.5, determined with a 0.1% by weight solution in decahydronaphthalene at 135° C.

Content of $C_3$ hydrocarbon: 45% by weight.

EXAMPLE 6

The copolymerization was carried out as described in comparative Example 1, with the exception that 1 gram of polyethylene glycol terephthalate having a particle size of about 50 to 150 microns was added to the dispersion medium. The polymer beads obtained did not agglomerate, they remained separate and were easy to filter.

Yield: 120 grams.
RSV: 1.9, determined with a 0.1% by weight solution in decahydronaphthalene at 135° C.
Content of $C_3$ hydrocarbon: 48% by weight.

EXAMPLE 7

The copolymerization was carried out as described in comparative Example 1 with the exception that 1 gram of polyacrylonitrile having a particle size of 20 to 100 microns was added. The separating polymer beads did not agglomerate and were easy to filter.

Yield: 132 grams.
RSV: 2.2, determined with a 0.1% by weight solution in decahydronaphthalene at 135° C.
Content of $C_3$ hydrocarbon: 46% by weight.

EXAMPLE 8

The copolymerization was carried out as described in comparative Example 1, but methylbutenyl-norbornene was additionally dropped into the reaction vessel in a proportion of $C_2:C_3$:MBN of 3:2:0.03. The 1,2-dichloroethane contained 2 grams of polypropylene as specified in Example 3. The polymer was obtained in the form of beads which did not agglomerate and were easy to filter.

Yield: 110 grams.
RSV: 1.7, determined with a 0.1% by weight solution in deca-hydronaphthalene at 135° C.
Content of $C_3$ hydrocarbon: 55% by weight.
C=C/1000 C: 3.5.

EXAMPLE 9

The copolymerization was carried out under the conditions specified in Example 1. 1,4-cis-hexadiene was additionally dropped into the reaction vessel in a proportion of $C_2:C_3$:HD of 3:2:0.3. In the dispersion medium 1 gram of polypropylene as specified in Example 3 was dispersed. The separating polymer beads did not agglomerate and were easy to filter, 850 milliliters of the dispersion medium could be directly recovered.

Yield: 90 grams.
RSV: 1.4, determined with a 0.1% by weight solution in decahydronaphthalene at 135° C.
Content of $C_3$ hydrocarbon: 44.3% by weight.
C=C/1000 C: 2.32.

EXAMPLE 10 (comparative example)

The copolymerization was carried out as described in Example 1, with the exception that 1 liter of methylene chloride was used as dispersion medium. Large agglomerating beads were obtained which, with a high degree of conversion, adhered to the stirrer in the form of great lumps.

Yield: 350 grams.
RSV: 3.1, determined with a 0.1% by weight solution in decahydronaphthalene at 135° C.
Content of $C_3$ hydrocarbon: 50.1% by weight.

EXAMPLE 11

The copolymerization was carried out as described in Example 10, with the exception that methylene chloride was used as dispersion medium containing 1 gram of polyethylene having a particle size of 50 to 100 microns (RSV 2.1). The polymer beads remained separate and were easy to filter.

Yield: 330 grams.
RSV: 3.5, determined with a 0.1% by weight solution in decahydronaphthalene at 135° C.
Content of $C_3$ hydrocarbon: 49.2% by weight.

EXAMPLE 12

The copolymerization was carried out as described in Example 10 with the exception that the methylene chloride used as dispersion medium contained 1 gram of polyvinyl chloride. The polymer beads obtained remained separate and were easy to filter.

Yield: 200 grams.
RSV: 3.1, determined with a 0.1% by weight solution in decahydronaphthalene at 135° C.
Content of $C_3$ hydrocarbon: 46.0% by weight.

What is claimed is:

1. A process for copolymerizing ethylene with higher $\alpha$-olefins of the formula R—CH=CH$_2$, in which R stands for an aliphatic, branched or straight-chain hydrocarbon radical having less than 7 carbon atoms, if desired together with a non-conjugated diene in an amount such that the terpolymer obtained has an iodine number of at most 50, under a pressure in the range of from 1 to 30 atmospheres and at a temperature ranging from —30 to +50° C., in the presence of a halohydrocarbon as dispersion medium, which halohydrocarbon does not dissolve the copolymer under the reaction conditions, using coordination catalysts comprising a vanadium compound and an organoaluminum compound both soluble in the dispersion medium used, which comprises carrying out the copolymerization in the presence of 0.0001 to 10% by weight, calculated on the dispersion medium, of a finely divided inert, solid organic polymer as separating agent which has a particle size of 0.005 to 300 microns, does not inhibit the polymerization activity and is soluble neither in the dispersion medium nor in the precipitating polymer, the copolymerization being effected with stirring or mechanical agitation.

2. The process of claim 1, wherein 0.05 to 3% by weight of polypropylene is used in 1,2-dichloroethane or methylene chloride as dispersion medium.

3. The process of claim 1, wherein 0.05 to 3% by weight of polyethylene is used in 1,2-dichloroethane or methylene chloride as dispersion medium.

4. The process of claim 1, wherein 0.05 to 3% by weight of poly-4-methylpentene-1 is used in 1,2-dichloroethane or methylene chloride as dispersion medium.

5. The process of claim 1, wherein 0.05 to 3% by weight of polyacrylonitrile is used in 1,2-dichloroethane or methylene chloride as dispersion medium.

6. The process fo claim 1, wherein for the manufacture of a vulcanizable, rubber-like copolymer, 1,4-cis-hexadiene, 1,4-trans-hexadiene, alkenyl-norbornenes, alkylidene-norbornenes or dicyclopentadiene or a mixture thereof is used as non-conjugated diene.

References Cited

UNITED STATES PATENTS 2,668,806   2/1954   Haward et al.

OTHER REFERENCES

Polymer Processes, Schildknecht (1956) pp. 78–81.

JOSEPH L. SCHOFER, Primary Examiner

S. M. LEVIN, Assistant Examiner

U.S. Cl. X.R.

260—75, 78, 85.5, 88.2, 92.1, 92.8, 93.7, 94.9